United States Patent Office 3,216,012
Patented Nov. 2, 1965

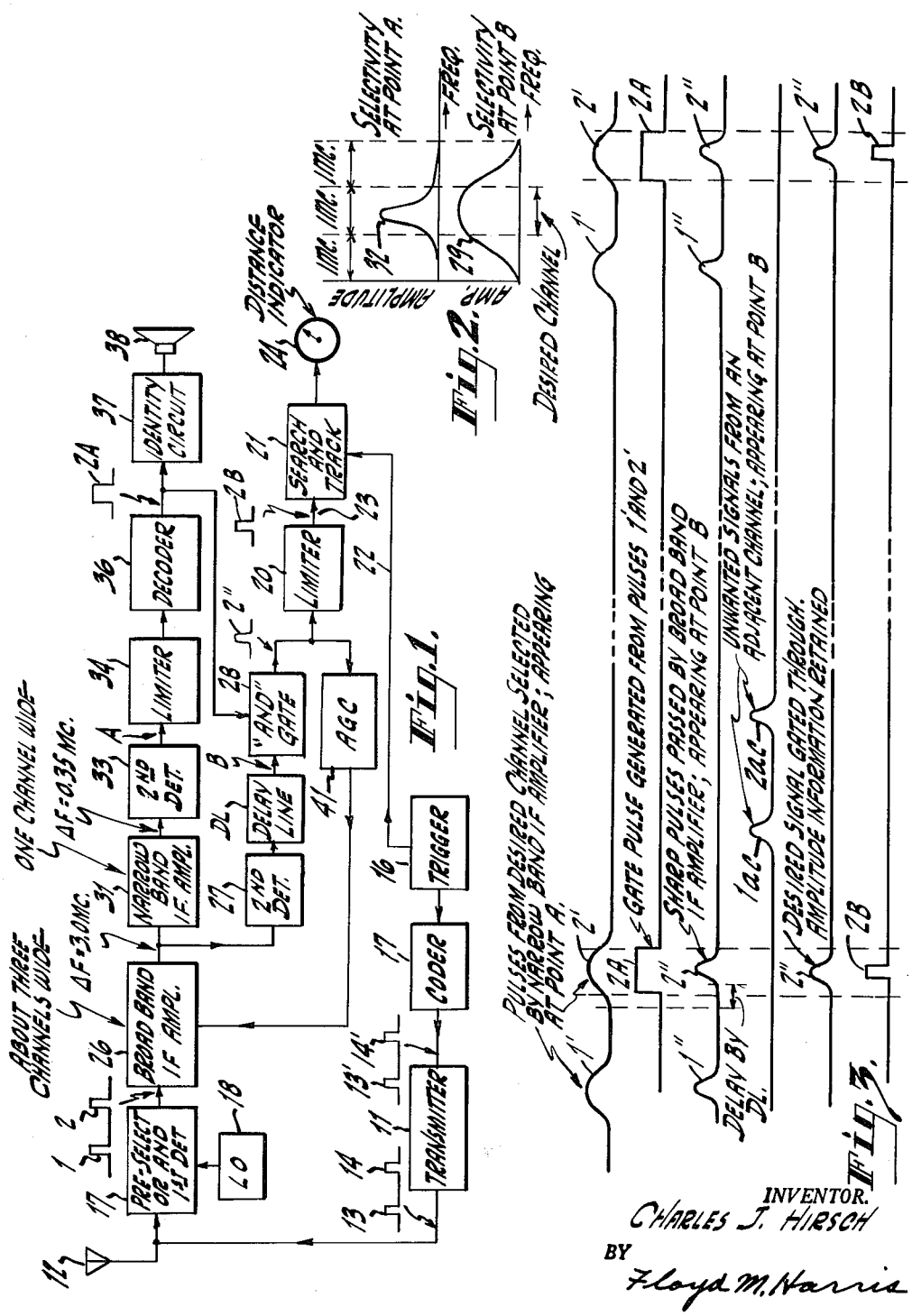

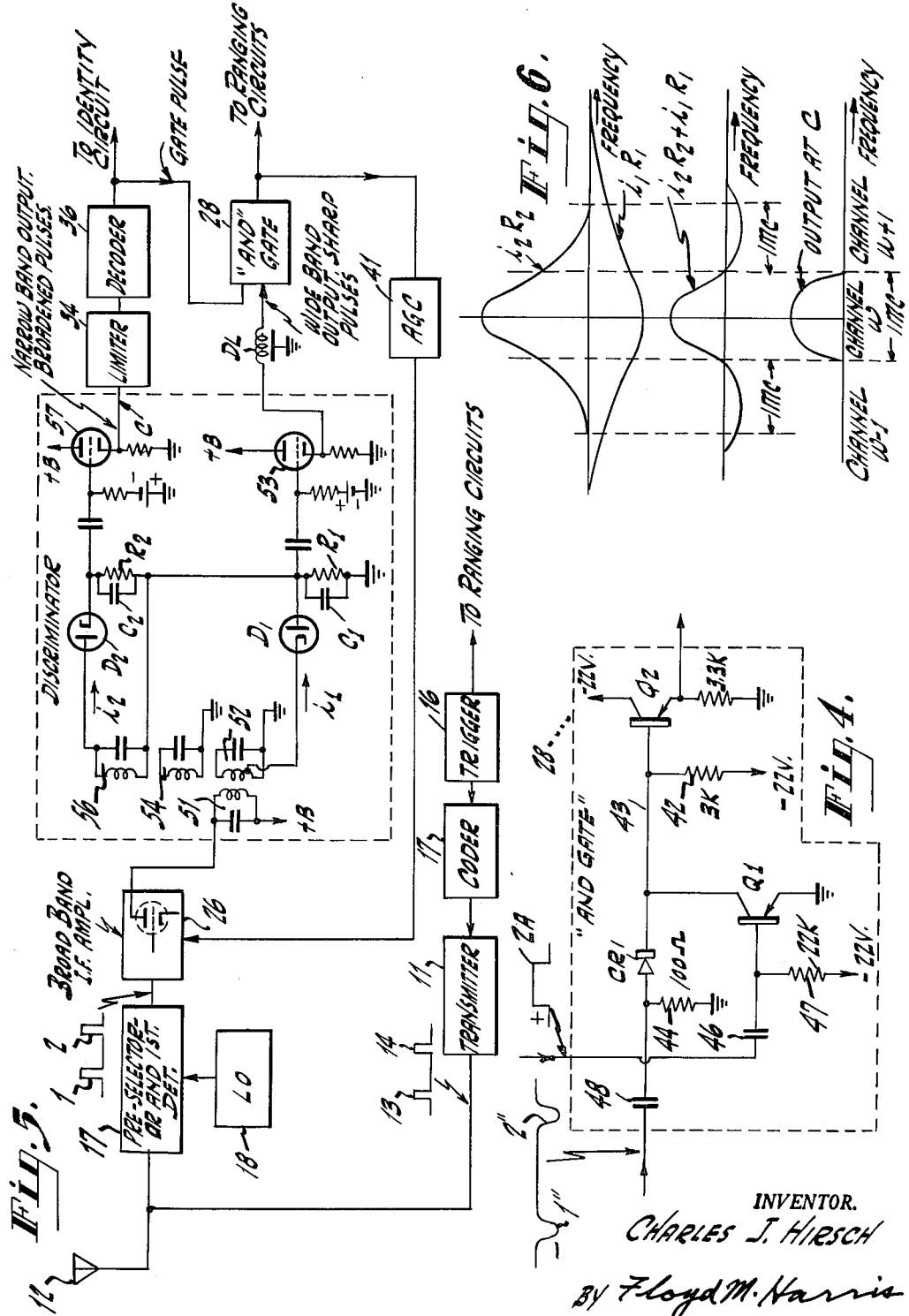

3,216,012
PULSE TRANSLATING APPARATUS
Charles J. Hirsch, Princeton, N.J., assignor to Radio Corporation of America, a corporation of Delaware
Filed Dec. 19, 1961, Ser. No. 160,475
15 Claims. (Cl. 343—13)

My invention relates to improved radio pulse translating apparatus, and particularly to improved receiving apparatus, for example, such as distance measuring equipment (referred to as DME) which requires a narrow band receiving channel for channel selectivity.

The narrow band requirement for DME has heretofore introduced the undesirable result that sharp pulses, i.e. pulses with a steep rise, were broadened at the DME receiver so that the pulses no longer had a steep rise. As a result, the distance measurement could not be made with the accuracy sometimes desirable.

An object of the present invention is to provide a receiver which restricts selectivity to a narrow band, and yet translates sharp pulses.

Another object of the invention is to provide improved pulse distance measuring apparatus which has good channel selectivity and which will also pass sharp pulses for accurate distance measurement.

A further object of the invention is to provide improved distance measuring equipment that has good channel selectivity and which provides distance measurements of improved accuracy.

The invention will be described specifically with respect to DME although the invention is not limited to such equipment. DME is airborne equipment which interrogates ground stations. The particular ground station interrogated replies on its assigned narrow band frequency channel, the reply being in the form of repetitively occurring pairs of pulses. Distance from the airborne DME to the ground station interrogated is determined at the DME by measuring the time interval between transmission of interrogation pulses and reception of reply pulses.

At the present time there are provided for DME operation 126 two-way operating channels, there being 126 interrogation channels of one megacycle spacing and 126 reply channels of one megacycle spacing. Each two-way channel is uniquely determined by a specific interrogation and a specific reply frequency. Each reply channel has a bandwidth of less than one megacycle because the reply channels are separated by one megacycle. The interrogation channel and the reply channel of a two-way channel, such as channel No. 1, are separated by 63 megacycles according to present practice. Signals, for both interrogation and reply, consist of a pair of pulses, having a spacing (code) between pulses of 12 microseconds according to present practice.

Separation of the reply channels, i.e., selection of the desired channel, is ordinarily obtained by use of a narrow band channel, such as a narrow band I.-F. amplifier, in the DME receiver. Such an amplifier widens the received pulses and makes them have such a gradual slope that they do not give a precise time measurement for determining distance.

If it were attempted to get sharper pulses merely by using a wide band I.-F. amplifier, pulses from the adjacent reply channels would pass through the I.-F. amplifier and a distance measurement to a ground station, other than the one interrogated, might be obtained. The present invention recognizes that pulses appearing in adjacent frequency channels seldom occur simultaneously with the pulses occurring on the desired frequency channel. Thus, it is possible to gate open a wide band I.-F. amplifier signal channel to pass pulses only when they occur in the desired frequency channel, the wide band amplifier channel being closed or blocked the rest of the time when pulses may be occurring on the adjacent frequency channels.

The gating open of the wide band I.-F. amplifier channel at the proper time may be accomplished as follows:

A narrow band I.-F. control amplifier passes only the signal of the selected frequency channel, i.e., the signal of the particular ground station being interrogated. This signal, in the form of pairs of pulses, is decoded to produce a single pulse which acts as a gate to open up the wide band amplifier signal channel. Therefore, only the pulses received from the ground station being interrogated are passed on to the distance determining circuit, and the pulses passed are sharp, i.e., they have steep slopes so that they provide a precise distance measurement. The amplitude information of these pulses is preserved so that the AGC may be obtained from the signal of the ground station being interrogated as is required for proper AGC operation.

The invention will be described in detail with reference to the accompanying drawing in which:

FIG. 1 is a block diagram showing one embodiment of the invention as applied to DME;

FIG. 2 is a pair of frequency selectivity graphs that are referred to in explaining the apparatus of FIG. 1;

FIG. 3 is a group of graphs that are referred to in explaining the operation of the apparatus of FIG. 1;

FIG. 4 is a circuit diagram of an "AND" gate or coincidence circuit that may be used in the apparatus of FIG. 1;

FIG. 5 is a block and circuit diagram showing another embodiment of the invention as applied to DME; and FIG. 6 is a group of graphs that are referred to in explaining the operation of the apparatus of FIG. 4.

In the several figures like parts are indicated by similar reference characters.

Refer now to FIG. 1 which shows an embodiment of the invention incorporated in airborne DME. This airborne unit comprises a transmitter 11 which radiates an interrogation signal from an antenna 12 for interrogation of a selected ground station. Assuming the ground station is assigned to channel No. 1, for example, and assuming present standards, the transmitted interrogation signal has a carrier frequency of 1025 megacycles. Present practice is to transmit a pair of pulses 13 and 14 that are spaced 12 microseconds apart. This pulse coding of the transmission is provided by a trigger pulse generator 16 which generates a repetitively occurring trigger pulse that is supplied to a coder 17. In response to the trigger pulse, the coder applies a pair of pulses 13', 14' to the transmitter 11 to modulate or key it.

The selected ground station replies in response to the interrogation. In the example assumed, it replies on a carrier frequency of 962 megacycles which is picked up by antenna 12 and supplied to a pre-selector and first detector 17 in the super-heterodyne receiver of the DME. The reply signal is coded so that it consists of pairs of pulses which are spaced 12 microseconds apart in the example being described. The pair of pulses appear as pulses 1 and 2 of I.-F. frequency at the output of the first detector. The local oscillator is indicated at 18.

It will be understood that the purpose of the DME is to determine the distance to the selected ground station by measuring the propagation time of the interrogation pulses and the reply pulses. This time measurement is made by a search and track circuit 21 which has trigger pulses applied to it over a lead 22, and has reply pulses applied to it over a lead 23 from a clipper or limiter 20. The distance may be shown on a dial indicator 24. Since search and track circuits of this character are well known in the radar and DME art, they need not be described here.

The output of the first detector is supplied to an I.-F. amplifier 26 that has a pass band wide enough to pass sharp pulses without substantial distortion so that the pulses are still sharp at the amplifier output. Thus, the amplified pulses will still have steeply rising slopes so that they will provide accurate time measurements. The amplified pulses are detected at a second detector 27, delayed slightly by a delay circuit DL, and supplied to an "AND" gate 28.

The broad band I.-F. amplifier 26, in the example here described, has a pass band about three reply channels in width, i.e., about three megacycles wide as illustrated by the selectivity graph 29 in FIG. 2. Therefore, signals on the reply channels adjacent to the selected or desired channel will unavoidably pass through the broad band amplifier since the desired selectivity is not provided by the pre-selector.

The reply signals appearing on the adjacent reply channels are prevented from passing through the "AND" gate 28 by gating open the "AND" gate only when reply signals are received on the selected channel, it being unlikely that reply signals (pulses) will occur at the same instant on the adjacent channels.

This gating open of the "AND" gate 28 at the proper time is accomplished by the use of a receiver channel that is narrow band so that it will pass reply signals on the selected reply channel only. In the example illustrated, the output of the broad band amplifier 26 is supplied to a narrow band I.-F. amplifier 31 having a pass band narrow enough to pass only the signal of the desired channel. In the specific example here described, the pass band is 0.35 megacycle as illustrated by the selectivity graph 32 in FIG. 2. It is apparent that any signals appearing in channels adjacent to the selected channel cannot pass through the amplifier 31.

The output of amplifier 31 is detected by a second detector 33 to obtain video frequency pulses which are clipped or limited by a limiter 34.

The pulse pairs from limiter 34 are supplied to a decoder 36, which may comprise the conventional delay line and coincidence tube arrangement, the delay line having a 12 microsecond delay in the example assumed. Pairs of pulses having the 12 microsecond spacing cause the decoder to produce an output pulse 2A coincident in time with the last occurring of the pulse pair 1, 2. This is illustrated by the graphs in FIG. 3. The pulse 2A is applied to the "AND" gate 28 to gate it open at the proper time.

The pulse 2A is also applied to an identity circuit 37 which supplies signals to a loud speaker 38. The identity circuit, which forms no part of the present invention, is customarily provided in DME to receive Morse code identification that is periodically transmitted by the ground stations.

The operation of the DME of FIG. 1 will now be described with reference to the graphs of FIG. 3. The pairs of reply pulses 1, 2 are broadened as they pass through the narrow band amplifier 31 and appear at the output of second detector 33 (point A) as the broadened pulses 1' and 2' (FIG. 3) having a gradual rise. After limiting and decoding the pair of pulses 1', 2', the gate pulse 2A is obtained and is applied to the "AND" gate 28.

The reply pulses from the broad band amplifier 26 remain sharp pulses, and after detection and delay appear at point B as the pair of pulses 1", 2". The delay provided by delay line DL is to make the pulse 2" occur at approximately the center of the gate pulse 2A. The pulses 1", 2" also are applied to the "AND" gate 28. Pulses originating in the adjacent channels will also appear at point B, but seldom at the same time as the reply pulses 1", 2". Such adjacent channel pulses are shown by way of example as pulses 1ac, 2ac.

Since the gate pulse 2A and the reply pulse 2" occur at the same time, the pulse 2" is gated through and is supplied to the limiter 20. Adjacent channel pulses such as 1ac and 2ac are not gated through. Thus, the desired channel selectivity is obtained, and the clipped pulses 2B applied to the search and track circuit 21 have the fast rise desired for accurate distance measurement.

The desired automatic gain control (AGC) for the selected reply channel is provided by means of an AGC circuit 41. The reply pulses 2", which retain the amplitude information, are applied to the AGC circuit. The AGC output is applied to amplifier stages in the broad band amplifier 26.

Since the pulse output of the "AND" gate 28 is to retain the amplitude information, the "AND" gate may be of any proper type for this purpose. Merely by way of example, one suitable type is illustrated in FIG. 4.

The "AND" gate or coincidence circuit 28 shown in FIG. 4 comprises a diode CR1 that is connected in the conducting direction to a minus 22 volt source. This 22 volt source is applied to the cathode of the CR1 through a resistor 42 and a lead 43. The conducting circuit through CR1 is completed by an input resistor 44 connected between the anode of CR1 and ground.

A normally conducting transistor Q1 normally holds the lead 43 at substantially ground potential. The collector of Q1 is connected to the lead 43, and thus to minus 22 volts through resistor 42. The emitter of Q1 is connected to ground. The base of Q1, to which the gate pulse 2A is applied through a blocking capacitor 46, has minus 22 volts applied to it through a resistor 47.

In the absence of a gate pulse 2A, transistor Q1 is conducting to hold lead 43 at ground potential. It is evident, therefore, that in the absence of a gate pulse 2A the pulses from the broad band receiver channel applied through a blocking capacitor 48 to diode CR1 cannot be passed on to an output amplifier Q2.

Gate pulses 2A, which are of positive polarity, will drive Q1 to non-conducting condition, thereby breaking the connection holding lead 43 at ground potential. Therefore, the lead 43 can follow the pulse amplitude appearing at the anode end of input resistor 44. For example, as illustrated in FIGS. 3 and 4, the gate pulses 2A are applied to Q1 simultaneously with the application of the steep pulse 2" (of negative polarity) to diode CR1. Therefore the "AND" circuit passes pulse 2" with its amplitude information preserved. Pulses such as 1ac and 2ac from an adjacent channel are not passed because at the instant that they occur Q1 is conducting so that lead 43 is being held at ground potential.

With respect to the output transistor Q2, it will be noted that a small negative potential is on the base due to the relatively small resistance of resistor 44 as compared with that of resistor 42.

Resistor values are indicated for the coincidence circuit merely by way of example. They are indicated in ohms and thousands of ohms.

In the embodiment of FIG. 5 the characteristics of a well known discriminator are utilized for providing the broad band and narrow band channels. The output of the broad band amplifier 26 is fed to the coupled tuned circuits 51, 52 which have approximately the same broad pass band as the amplifier 26. The signal passed by 51, 52 is supplied to a detector comprising a diode D1 and an output resistor R1 shunted by a capacitor C1. The current passing through diode D1 is indicated as $i_1$.

The selectivity of the wide band channel is indicated by the graph $i_1R_1$ in FIG. 6. It will be noted that it is substantially three reply channels wide. In accordance with this embodiment of the invention, the wide band channel output appearing across $R_1$ is supplied through a wide band amplifier stage 53 and the delay line DL to the "AND" gate 28.

The discriminator comprises another detector comprising diode D2 and an output resistor $R_2$ shunted by a capacitor $C_2$. Signal is applied to diode D2 from tuned circuit 52 through tuned circuits 54 and 56 which have a narrow pass band. The narrow pass band characteristic is shown by the graph $i_2R_2$ in FIG. 6.

The lower end of load resistor $R_2$ is connected to the diode end of load resistor $R_1$. The sum of the signals appearing across $R_1$ and $R_2$ is applied to an amplifier stage 57. Since the diodes D1 and D2 are connected to supply opposite polarity outputs, the sum signal is that shown by the graph $i_2R + i_2R_1$ of FIG. 6. The stage 57 is biased beyond cut-off so that the output at point C is as shown in FIG. 6. It is evident that the output at point C is that of a narrow band channel that has a pass band narrow enough to select the desired reply channel to the exclusion of the adjacent channels. This output is supplied through the limiter 34 and decoder 36 to obtain gate pulses that are applied to the "AND" gate 28. Thus, as described in connection with FIG. 1, of all the sharp pulses applied to the "AND" gate 28, substantially only those from the selected reply channel will be passed by the "AND" gate since they are substantially the only ones that occur simultaneously with the gate pulses. Therefore, steep rise reply pulses from the selected ground station are transmitted, still with a steep rise, to the ranging circuits (search and track circuits) whereby distance measurements of improved accuracy may be obtained.

What is claimed is:

1. A pulse receiver having channel selectivity such that radio pulses transmitted on a desired channel may be selected to the exclusion of pulses transmitted on the channels adjacent to the desired channel, said receiver having a tunable input circuit for tuning the receiver to the desired channel, said tunable input circuit having a passband wide enough to pass pulses from said desired channel with no more than minor distortion whereby pulses from the channels adjacent to the desired channel may unavoidably be passed, a narrowband channel and a wideband channel to which are supplied from said tunable input circuit signals containing said pulses, said narrowband channel having a passband narrow enough to select a single desired one of said channels, means for converting the selected channel pulses passed by said narrowband channel to gate pulses, said wideband channel having a passband wide enough to pass received pulses with no more than minor distortion, a gate located in said wideband channel, and means for applying said gate pulses to said gate so that the only pulses passed by said gate are those that occur simultaneously with said gate pulses.

2. A pulse receiver having channel selectivity such that radio pulses transmitted on a desired channel may be selected to the exclusion of pulses transmitted on the channels adjacent to the desired channel, said receiver comprising a wideband channel having a frequency passband that is wide enough to pass pulses without serious distortion whereby pulses from the desired channel and also pulses from at least one adjacent channel are passed, an "AND" gate to which pulses from said wideband channel are applied, said receiver further comprising a narrowband channel having a frequency passband that is narrow enough to select a desired channel to the exclusion of adjacent channels, means for converting the pulses passed by said narrowband channel into gate pulses, and means applying said gate pulses to said "AND" gate so that the only pulses from said wideband channel that are passed by said "AND" gate are those that occur simultaneously with said gate pulses, said "AND" gate being of a type that preserves the amplitude information on the pulses passed thereby, an automatic gain control circuit to which said passed pulses passed by the "AND" gate are applied, and means supplying the output of said automatic gain control circuit to at least one of said receiver channels to control its gain.

3. A pulse receiver for the reception of pulses that arrive at the receiver on closely spaced frequency channels, said receiver comprising a tunable input circuit for tuning the receiver to the desired channel, a broadband channel to which are supplied from said tunable input circuit signals containing said pulses, an "AND" gate to which pulses passed by said broadband channel are applied, a narrowband channel to which are supplied from said tunable input circuit signals containing the received pulses, said narrowband channel having a passband that is sufficiently narrow to select a desired one of said frequency channels to the exclusion of adjacent frequency channels, whereby said narrowband channel distorts the pulses of the selected channel, means for converting the pulses passed by said narrowband channel into gate pulses, and means for applying said gate pulses to said "AND" gate for causing it to pass an applied pulse from the broadband channel only in response to the occurrence of a gate pulse simultaneously therewith.

4. In DME, a receiver comprising a broadband channel through which received reply pulses are passed, an "AND" gate to which said passed pulses are applied, a narrowband channel through which received reply pulses are passed, said narrowband channel having a passband that is sufficiently narrow to select a desired reply channel to the exclusion of adjacent reply channels, whereby said narrowband channel unavoidably distorts the reply pulses of the selected channel, means for converting the pulses passed by said narrowband channel into gate pulses, and means for applying said gate pulses to said "AND" gate for causing it to pass an applied pulse from the broadband channel only in response to the occurrence of a gate pulse simultaneously therewith, said "AND" gate being of a type that preserves the amplitude information on the pulses passed thereby, an automatic gain control circuit to which said pulses passed by the "AND" gate are applied, and means supplying the output of said automatic gain control circuit to said wideband channel to control its gain.

5. A pulse receiver having channel selectivity such that radio pulses transmitted on a desired channel may be selected to the exclusion of pulses transmitted on the channels adjacent to the desired channel, said receiver having a tunable input circuit for tuning the receiver to the desired channel, said tunable input circuit having a passband wide enough to pass steep rise pulses from said desired channel with so little distortion that they still have a steep rise whereby pulses from the channels adjacent to the desired channel may unavoidably be passed, a narrowband channel and a wideband channel to which are supplied from said tunable input circuit signals containing said pulses, said narrowband channel having a passband narrow enough to select a single desired one of said channels, means for converting the selected channel pulses passed by said narrowband channel to gate pulses, said wideband channel having a passband wide enough to pass received pulses with so little distortion that they still have a steep rise, a gate, means for applying to said gate both said gate pulses and said pulses passed by said wideband channel so that the only pulses from said wideband channel that are passed by said gate are those that occur simultaneously with said gate pulses.

6. Apparatus for determining distance to an object, said apparatus comprising means for radiating radio pulses to said object and means for receiving radio pulses from said object in response to said radiation; said receiving means comprising a wideband amplifier channel through which received pulses are passed with only minor distortion, a narrowband channel through which received pulses are passed with a substantial amount of distortion, said narrowband channel having a passband that is narrow enough to select the channel on which the pulses of interest are being received to the exclusion of pulses on adjacent channels, means for converting the pulses passed by said narrowband channel to gate pulses, an "AND" gate, and means for applying to said "AND" gate both said gate pulses and the pulses passed by said wideband channel so that the only pulses from said wideband channel that are passed by said "AND" gate are those that occur simultaneously with said gate pulses.

7. Distance measuring equipment that is to be airborne for operation with ground stations that transmit a reply in response to interrogation by said airborne equipment, said equipment comprising means for interrogating a selected ground station which replies by transmission of radio pulses on its assigned frequency channel, the assigned reply channels of said ground stations being comparatively narrow frequency band and closely spaced, said equipment comprising a superheterodyne receiver having a narrowband I.-F. channel that has a passband narrow enough to select a single desired one of the ground station reply channels whereby it substantially distorts the reply pulses passed therethrough, means for converting the selected channel pulses passed by said narrowband I.-F. channel to gate pulses, said receiver also having a wideband I.-F. channel that has a passband wide enough to pass received pulses with only minor distortion, an "AND" gate, means for applying to said "AND" gate both said gate pulses and said pulses passed by said wideband I.-F. channel so that the only pulses from said wideband I.-F. channel that are passed by said "AND" gate are those that occur simultaneously with said gate pulses.

8. The invention according to claim 7 wherein said "AND" gate is of a type that preserves the amplitude information on the pulses passed thereby, and wherein there is an automatic gain control circuit to which said passed pulses are applied, the output of said automatic gain control circuit being supplied to at least one of said I.-F. channels to control its gain.

9. Distance measuring equipment that is to be airborne for operation with ground stations that transmit a reply in response to interrogation by said airborne equipment, said equipment comprising means for interrogating a selected ground station which replies by transmission of radio pulses on its assigned frequency channel, the assigned reply channels of said ground stations being comparatively narrow frequency band and closely spaced, said equipment comprising a receiver having a wideband amplifier that has a passband wide enough to pass received pulses with only minor distortion, a Ferris discriminator having two detectors and having a wide passband tuned circuit to which signal from said amplifier is supplied, said wideband tuned circuit being connected to supply signal to one of said two detectors, said discriminator having a narrow passband tuned circuit coupled to said wideband tuned circuit and connected to supply signal to the other of said two detectors, said two detectors being oppositely connected to supply opposite polarity outputs, the output circuits of said two detectors being connected to add whereby the sum of said outputs is the numerical difference of the two outputs, an output stage biased beyond cutoff to which said sum output is applied whereby the output of said output stage is a narrow passband output that has a passband narrow enough to select a single desired one of the ground station reply channels, the reply pulses passing through said narrow passband tuned circuits being substantially distorted, means for converting to gate pulses the selected channel pulses appearing at the output of said output stage, an "AND" gate, means for applying to said "AND" gate both said gate pulses and said pulses appearing at the output of the detector supplied from said wideband tuned circuit so that the only pulses from said wideband tuned circuit that are passed by said "AND" gate are those that occur simultaneously with said gate pulses.

10. Distance measuring equipment that is to be airborne for operation with ground stations that transmit a reply in response to interrogation by said airborne equipment, said equipment comprising means for interrogating a selected ground station which replies by transmission of radio pulses on its assigned frequency channel, the assigned reply channels of said ground stations being comparatively narrow frequency band and closely spaced, said equipment comprising a superheterodyne receiver having a wideband I.-F. amplifier that has a passband wide enough to pass received pulses with only minor distortion, a Ferris discriminator having two detectors and having a wide passband tuned circuit to which signal from said I.-F. amplifier is supplied, said wideband tuned circuit being connected to supply signal to one of said two detectors, said discriminator having a narrow passband tuned circuit coupled to said wideband tuned circuit and connected to supply signal to the other of said two detectors, said two detectors being oppositely connected to supply opposite polarity outputs, the output circuits of said two detectors being connected to add whereby the sum of said outputs is the numerical difference of the two outputs, an output stage biased beyond cutoff to which said sum output is applied whereby the output of said output stage is a narrow passband output that has a passband narrow enough to select a single desired one of the ground station reply channels, the reply pulses passing through said narrow passband tuned circuits being substantially distorted, means for converting to gate pulses the selected channel pulses appearing at the output of said output stage, an "AND" gate, means for applying to said "AND" gate both said gate pulses and said pulses appearing at the output of the detector supplied from said wideband tuned circuit so that the only pulses from said wideband tuned circuit that are passed by said "AND" gate are those that occur simultaneously with said gate pulses.

11. A pulse receiver having channel selectivity such that radio pulses transmitted on a desired channel may be selected to the exclusion of pulses transmitted on the channels adjacent to the desired channel, said receiver having a wideband amplifier that has a passband wide enough to pass received pulses with no more than minor distortion, a Ferris discriminator having two detectors and having a wide passband tuned circuit to which signal from said amplifier is supplied, said wideband tuned circuit being connected to supply signal to one of said two detectors, said discriminator having a narrow passband tuned circuit coupled to said wideband tuned circuit and connected to supply signal to the other of said two detectors, said two detectors being oppositely connected to supply opposite polarity outputs, the output circuits of said two detectors being connected to add whereby the sum of said outputs is the numerical difference of the two outputs, an output stage biased beyond cutoff to which said sum output is applied whereby the output of said output stage is a narrow passband output that has a passband narrow enough to select a single desired channel, means for converting to gate pulses the selected channel pulses appearing at the output of said output stage, a gate, means for applying to said gate both said gate pulses and said pulses appearing at the output of the detector supplied from said wideband tuned circuit so that the only pulses from said wideband tuned circuit that are passed by said gate are those that occur simultaneously with said gate pulses.

12. A pulse receiver having channel selectivity such that radio pulses transmitted on a desired channel may be selected to the exclusion of pulses transmitted on the channels adjacent to the desired channel, said receiver being of the superheterodyne type having a narrowband I.-F. channel that has a passband narrow enough to select a single desired one of said channels, means for converting the selected channel pulses passed by said narrowband I.-F. channel to gate pulses, said receiver also having a wideband I.-F. channel that has a passband wide enough to pass received pulses with no more than minor distortion, a gate, means for applying to said gate both said gate pulses and said pulses passed by said wideband I.-F. channel so that the only pulses from said wideband I.-F. channel that are passed by said gate are those that occur simultaneously with said gate pulses.

13. A pulse receiver having channel selectivity such that radio pulses transmitted on a desired channel may be selected to the exclusion of pulses transmitted on the channels adjacent to the desired channel, said receiver being of the superheterodyne type having a narrowband I.-F. channel that has a passband narrow enough to select a single desired one of said channels, said narrowband channel having a certain transfer characteristic, means for converting the selected channel pulses passed by said narrowband I.-F. channel to gate pulses, said receiver also having a second I.-F. channel that has a different transfer characteristic, a gate, means for applying to said gate both said gate pulses and the pulses passed by said second I.-F. channel so that the only pulses from said second I.-F. channel that are passed by said gate are those that occur simultaneously with said gate pulses.

14. A pulse receiver having channel selectivity such that radio pulses transmitted on a desired channel may be selected to the exclusion of pulses transmitted on the channels adjacent to the desired channel, said receiver being of the superheterodyne type having a first I.-F. channel that has a certain transfer characteristic, means for converting the pulses passed by said first I.-F. channel to gate pulses, said receiver also having a second I.-F. channel that has a different transfer characteristic, a gate, means for applying to said gate both said gate pulses and the pulses passed by said second I.-F. channel so that the only pulses from said second I.-F. channel that are passed by said gate are those that occur simultaneously with said gate pulses.

15. A pulse receiver having channel selectivity such that radio pulses transmitted on a desired channel may be selected to the exclusion of pulses transmitted on an adjacent channel, said receiver being of the superheterodyne type having a narrowband channel that has a passband narrow enough to select a single desired one of said channels, means for converting the selected channel pulses passed by said narrowband channel to gate pulses, said receiver also having a wideband channel that has a passband wide enough to pass received pulses with no more than minor distortion, a gate located in said wideband channel, and means for applying said gate pulses to said gate for controlling which pulses applied to said wideband channel appear at the output of said wideband channel.

References Cited by the Examiner
UNITED STATES PATENTS

| | | | |
|---|---|---|---|
| 2,362,958 | 11/44 | Sandretto | 325—474 |
| 3,015,026 | 12/61 | Milton et al. | 343—17.1 |
| 3,023,409 | 2/62 | Smith et al. | 343—17.1 |
| 3,042,800 | 7/62 | Gluth | 325—474 |
| 3,077,601 | 2/63 | Newhouse | 343—5 |

CHESTER L. JUSTUS, *Primary Examiner.*